B. O. RHODES.
UNIVERSAL JOINT.
APPLICATION FILED NOV. 20, 1907.

923,443.

Patented June 1, 1909.

Witnesses
Lulu Greenfield
Gertrude Tallman

Inventor
Bert O. Rhodes
Chappell & End
By
Attorneys

UNITED STATES PATENT OFFICE.

BERT O. RHODES, OF KALAMAZOO, MICHIGAN, ASSIGNOR OF ONE-HALF TO CLOVIS V. SALISBURY, OF KALAMAZOO, MICHIGAN.

UNIVERSAL JOINT.

No. 923,443.        Specification of Letters Patent.        Patented June 1, 1909.

Application filed November 20, 1907. Serial No. 403,032.

*To all whom it may concern:*

Be it known that I, BERT O. RHODES, a citizen of the United States, residing in the city and county of Kalamazoo, State of Michigan, have invented certain new and useful Improvements in Universal Joints, of which the following is a specification.

This invention relates to improvements in universal joints.

The main objects of this invention are: First, to provide an improved universal joint, which is capable of withstanding great strain and is very durable. Second, to provide an improved universal joint in which the bearings are thoroughly protected from dust and dirt. Third, to provide an improved universal joint in which the bearings are effectively lubricated, and the lubricant carried to the bearings by the revolution of the joint.

Further objects, and objects relating to structural details, will definitely appear from the detailed description to follow.

I accomplish the objects of my invention by the devices and means described in the following specification.

The invention is clearly defined and pointed out in the claims.

Figure 1:
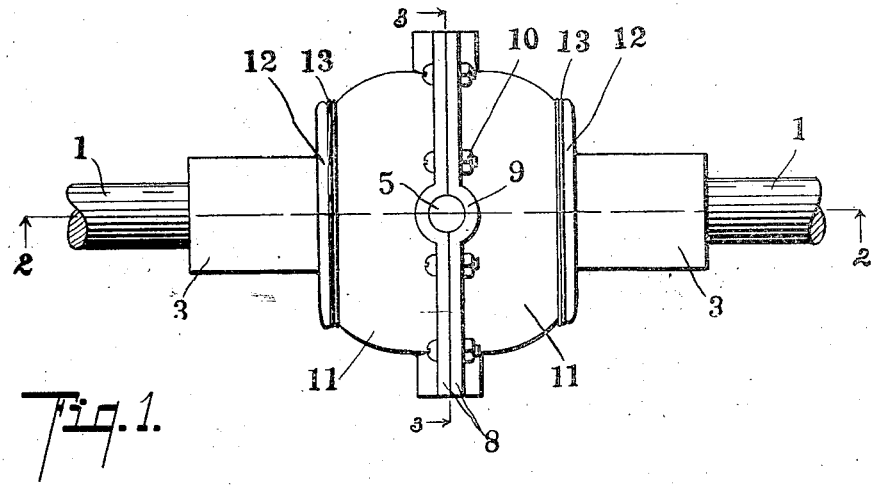
Figure 2:
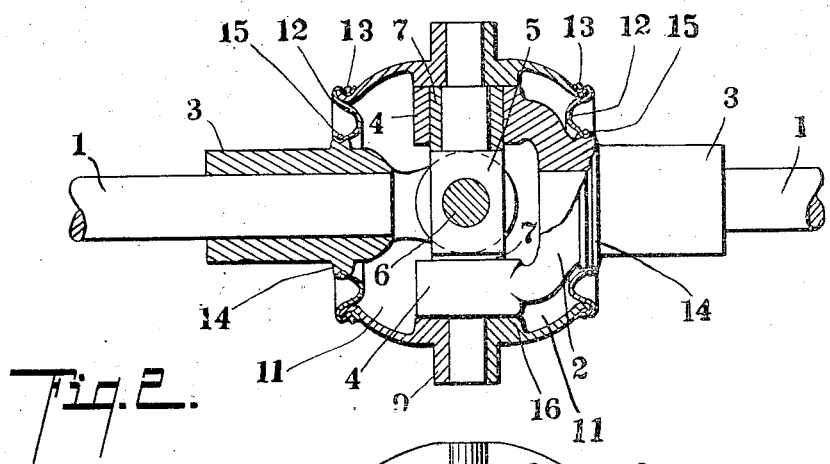
Figure 3:
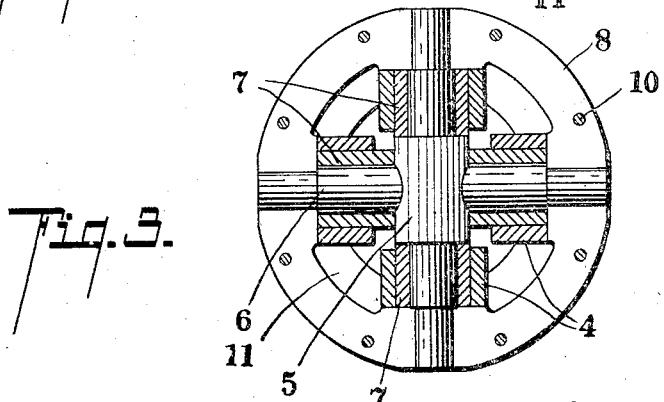

A structure embodying the features of my invention is clearly illustrated in the accompanying drawing, forming a part of this specification, in which, Figure 1 is a side elevation of my improved universal joint, it being shown attached to a pair of shafts to be coupled. Fig. 2 is a detail longitudinal section, taken on a line corresponding to line 2—2 of Fig. 1, parts being shown in full lines to better show their form. Fig. 3 is a cross section, taken on a line corresponding to line 3—3 of Fig. 1, the cross being shown in full lines.

In the drawing, the sectional views are taken looking in the direction of the little arrows at the ends of the section lines, and similar numerals of reference refer to similar parts throughout the several views.

Referring to the drawing, 1—1 represent the shafts to be joined. The fork members 2 are provided with hollow shanks 3 adapted to receive the ends of the shafts 1 and with bearings 4 on their arms, the bearings being at right angles to the shafts.

The cross preferably consists of the members 5 and 6, the member 5 being formed with a central enlargement and with reduced or shouldered ends and bearing portions between the ends and the central enlargement. The cross member 6 is arranged transversely through the central enlargement of the other member and is provided with reduced ends and with bearing portions at each side of the central enlargement. The bearing portions are preferably provided with bushings 7.

In assembling the parts, the cross member 5 is passed through its fork member and the bushings inserted. The bushings are then inserted in the other fork member, and the cross member 6 is put in place after the fork member has been brought into proper position.

I provide a casing for the fork members and cross, preferably consisting of a pair of ring-like members 8 having seats 9 therein adapted to receive the reduced ends of the cross members. These rings are clamped upon the cross members by means of the screw bolts 10, or the like. The casing walls 11 are preferably formed integral with the rings 8, and are preferably tapered outwardly or conical in general form, as clearly appears from the drawing. These casing walls are provided with extensions 12 of flexible material, which are secured to the edges of the walls by means of a suitable wire, as 13, or the like, the walls being grooved to receive the same. The flexible extensions 12 are also connected to the shanks of the forks, the shanks of the forks being preferably provided with annular ribs 14 having peripheral grooves therein in which the outer edges of the extensions are secured by means of suitable wires, as 15. This incloses the fork members and the cross, so that they are thoroughly protected from dust and dirt, and the casing also serves as a lubricant receptacle. The flexible extensions for the walls, when the joint is moved, serve to agitate the lubricant, so that it is effectively worked into the bearings. It is intended in practice that the casing be filled full of the lubricant, but, in the event that it is only partially filled, the lubricant is carried to the bearing, owing to the shape of the casing. The casing is preferably provided with bearing surfaces 16 for the fork, so that lateral movement thereof is prevented. The bushings 7 are preferably clamped between the central enlargement of the cross member 5 and these bearing surfaces, so that revolution of the bushings is prevented, thereby preventing wear thereon, and, in the event of the bushings becoming worn, they can be readily replaced. The fork members are rigidly clamped together by my improved arrangement, so that, while the forks move freely, the structure is rigid and strong. The parts can be assembled so that there is no unnecessary looseness, or play of the parts upon each other, which is obviously very objectionable in a structure of this class. A further advantage of thus connecting and supporting the members is that they may be comparatively light and still possess great strength, owing to their being effectively supported or braced.

I have illustrated and described my improved universal joint in detail in the form preferred by me on account of its structural simplicity and the convenience with which the parts may be assembled. I am, however, aware that it is capable of considerable variation in structural detail without departing from my invention, and I desire to be understood as claiming the same specifically, as illustrated, as well as broadly.

Having thus described my invention, what I claim as new and desire to secure by Letters Patent is:

1. In a universal joint, the combination with shafts to be joined, of fork members having shanks adapted to receive said shafts and bearings in their arms at right angles to the shafts; a cross, comprising a member having a central enlargement and shouldered ends and bearing portions at each side of said central enlargement and a second cross member arranged transversely through said central enlargement having shouldered ends and bearing portions at each side of said central enlargement; a casing comprising a pair of rings having seats therein adapted to receive the shouldered ends of said cross members and casing walls, said casing being provided with bearing surfaces for said fork members, whereby their lateral movement is prevented; flexible extensions for said casing walls connected thereto and to the shanks of said forks; and bushings for said bearing portions of said cross members clamped between said central enlargement thereof and said bearing surfaces of said casing.

2. In a universal joint, the combination with shafts to be joined, of fork members having shanks adapted to receive said shafts and bearings in their arms at right angles to the shafts; a cross, comprising a member having a central enlargement and shouldered ends and bearing portions at each side of said central enlargement and a second cross member arranged transversely through said central enlargement having shouldered ends and bearing portions at each side of said central enlargement; a casing comprising a pair of rings having seats therein adapted to receive the shouldered ends of said cross members and casing walls, said casing being provided with bearing surfaces for said fork members, whereby their lateral movement is prevented; and flexible extensions for said casing walls connected thereto and to the shanks of said forks.

3. In a universal joint, the combination with shafts to be joined, of fork members having shanks adapted to receive said shafts and bearings in their arms at right angles to the shafts; a cross, comprising a member having a central enlargement and shouldered ends and bearing portions at each side of said central enlargement and a second cross member arranged transversely through said central enlargement having shouldered ends and bearing portions at each side of said central enlargement; a casing comprising a pair of rings having seats therein adapted to receive the shouldered ends of said cross members and casing walls; and flexible extensions for said casing walls connected thereto and to the shanks of said forks.

4. In a universal joint, the combination with shafts to be joined, of fork members having shanks adapted to receive said shafts and bearings in their arms at right angles to the shafts; a cross, comprising a member having a central enlargement and shouldered ends and bearing portions at each side of said central enlargement and a second cross member arranged transversely through said central enlargement having shouldered ends and bearing portion at each side of said central enlargement a pair of rings having seats therein adapted to receive the shouldered ends of said cross members, said rings being provided with bearing surfaces for said fork members, whereby their lateral movement is prevented; and bushings for said bearing portions of said cross members clamped between said central enlargement thereof and said bearing surfaces of said casing.

5. In a universal joint, the combination with shafts to be joined, of fork members having shanks adapted to receive said shafts and bearings in their arms at right angles to the shafts; a cross, comprising a member having a central enlargement and shouldered ends and bearing portions at each side of said central enlargement and a second cross member arranged transversely through said central enlargement having shouldered ends and bearing portions at each side of said central enlargement; and a pair of rings having seats therein adapted to receive the shouldered ends of said cross members, said rings being provided with bearing surfaces for the shouldered ends of said cross members and for said fork members, whereby their lateral movement is prevented.

6. In a universal joint, the combination with shafts to be joined, of fork members having shanks adapted to receive said shafts and bearings in their arms at right angles to the shafts; a cross, comprising a member having a central enlargement and shouldered ends and bearing portions at each side of said central enlargement and a second cross member arranged transversely through said central enlargement having shouldered ends and bearing portions at each side of said central enlargement; and a pair of rings having seats therein adapted to receive the shouldered ends of said cross members, the shouldered ends of said cross members being adapted to bear against the ring whereby the lateral movement of the cross, and the fork members relative to each other is prevented.

7. In a universal joint, the combination with fork members, of a cross; a casing comprising a pair of rings having seats therein adapted to receive the ends of the cross and outwardly-tapered casing walls, said casing being provided with bearing surfaces for said fork members, whereby their lateral movement is prevented; and flexible extensions for said casing walls connected thereto and to the said fork members.

8. In a universal joint, the combination with fork members, of a cross; a casing comprising a pair of rings having seats therein adapted to receive the ends of the cross and outwardly-tapered casing walls; and flexible extensions for said casing walls connected thereto and to the said fork members.

9. In a universal joint, the combination with fork members, of a cross; a casing arranged to inclose said fork members and cross secured to the ends of the cross, said casing being tapered outwardly, and being provided with bearing surfaces for said fork members, whereby their lateral movement is prevented; and flexible extensions for said casing connected thereto and to the said fork members.

10. In a universal joint, the combination with fork members, of a cross; a casing arranged to inclose said fork members and cross secured to the ends of the cross, said casing being tapered outwardly; and flexible extensions for said casing connected thereto and to the said fork members.

11. In a universal joint, the combination with the fork members, of a cross; and an inclosing casing for said fork members and cross comprising a body portion having unyielding walls secured to said cross and projecting outwardly at each side thereof to embrace said forks, and flexible extensions for said body portion secured to the outer edges thereof and to said forks, said flexible extensions being deflected inwardly so that they extend within the outer edges of said body portion.

12. In a universal joint, the combination with the fork members, of a cross; and an inclosing casing for said fork members and cross, comprising a body portion having unyielding walls carried by said cross and projecting outwardly at each side thereof to embrace said forks, and flexible portions secured to said body portion at its outer edges and to said forks, said casing being adapted to receive a lubricant whereby, on the movement of said joint, said flexible portions are flexed, thereby agitating the lubricant within the casing.

In witness whereof, I have hereunto set my hand and seal in the presence of two witnesses.

BERT O. RHODES. [L. S.]

Witnesses:
LUELLA G. GREENFIELD,
CLORA E. BRADEN.